United States Patent
Maruyama (10) Patent No.: US 8,264,252 B2
(45) Date of Patent: Sep. 11, 2012

(54) TERMINATION CIRCUIT, SEMICONDUCTOR DEVICE, AND ELECTRONIC DEVICE

(75) Inventor: Hiroshi Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 12/891,340

(22) Filed: Sep. 27, 2010

(65) Prior Publication Data

US 2011/0128098 A1    Jun. 2, 2011

Related U.S. Application Data

(63) Continuation of application No. PCT/JP2008/000835, filed on Mar. 31, 2008.

(51) Int. Cl.
*H03K 17/16* (2006.01)

(52) U.S. Cl. ............... 326/30; 326/21; 326/26; 326/27; 326/86

(58) Field of Classification Search .............. 326/30, 326/21–27, 86; 327/108–112
See application file for complete search history.

(56) References Cited

U.S. PATENT DOCUMENTS

| | | | |
|---|---|---|---|
| 5,341,039 A * | 8/1994 | Fukumoto | 326/30 |
| 5,559,448 A | 9/1996 | Koenig | |
| 5,596,285 A | 1/1997 | Marbot et al. | |
| 5,731,711 A * | 3/1998 | Gabara | 326/30 |
| 6,906,550 B2 * | 6/2005 | Dreps et al. | 326/30 |
| 6,985,009 B2 * | 1/2006 | Nishio et al. | 326/30 |
| 7,154,295 B2 * | 12/2006 | Choe | 326/30 |
| 7,482,832 B2 | 1/2009 | Koshita | |

FOREIGN PATENT DOCUMENTS

| | | |
|---|---|---|
| JP | 7-202674 | 8/1995 |
| JP | 7-212219 | 8/1995 |
| JP | 7-297678 | 11/1995 |
| JP | 9-148910 | 6/1997 |
| JP | 09-261035 | 10/1997 |
| JP | 2006-042136 | 2/2006 |
| JP | 2006-332276 | 12/2006 |

OTHER PUBLICATIONS

International Search Report issued Jul. 1, 2008 in corresponding International Application No. PCT/JR2008/000835.

* cited by examiner

*Primary Examiner* — Vibol Tan
(74) *Attorney, Agent, or Firm* — Fujitsu Patent Center (57) ABSTRACT

The termination circuit includes first and second resistance circuits and is connected to a transmission line. The first resistance circuit is disposed on at least one of a pull-up side, which is between the transmission line and a power source, and a pull-down side, which is between the transmission line and ground, and has a negative property, by which an increase in an applied voltage decreases a resistance value of the first resistance circuit. The second resistance circuit is connected in parallel to the first resistance circuit. The second resistance circuit has a positive property, by which an increase in the applied voltage increases a resistance value of the second resistance circuit.

7 Claims, 12 Drawing Sheets

TERMINATION CIRCUIT, SEMICONDUCTOR DEVICE, AND ELECTRONIC DEVICE

CROSS-REFERENCE TO RELATED APPLICATIONS

This application is a continuation of an international application PCT/JP2008/000835, which was filed on Mar. 31, 2008, the entire contents of which are incorporated herein by reference.

FIELD

The present invention relates to a termination circuit, a semiconductor device including the termination circuit, and an electronic device including the semiconductor device.

BACKGROUND

When semiconductor devices such as LSIs or the like are connected through transmission lines, impedance matching is important to avoid reflection or the like of the signals. A termination circuit is connected to the transmission line for impedance matching.

There are plural circuit configurations for the termination circuit. Many such configurations include a resistance circuit disposed on at least one of the pull-up side, which is between a transmission line and a power source (the positive side), and the pull-down side, which is between the transmission line and the ground (the negative side of the power source). Thevenin termination includes resistance circuits disposed on both the pull-up side and the pull-down side.

Figure 1A:
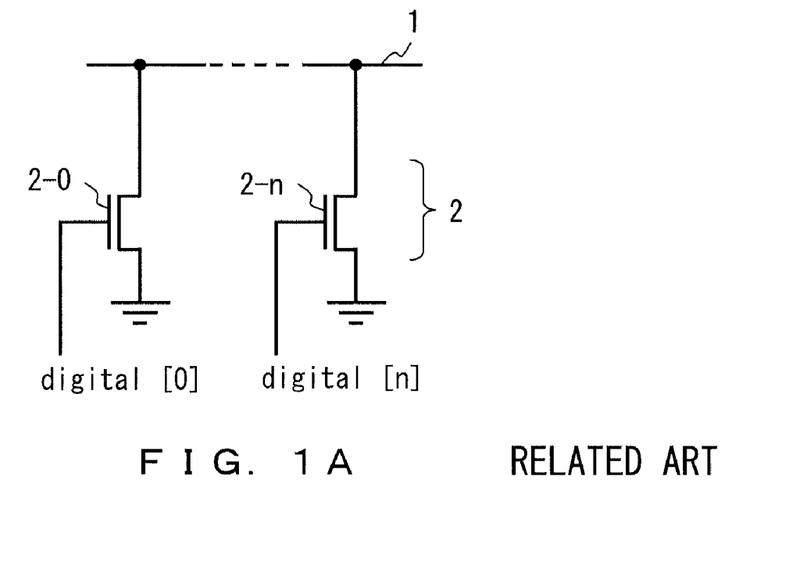
FIG. 1A through FIG. 1C illustrate conventional termination circuits.
Figure 1B:
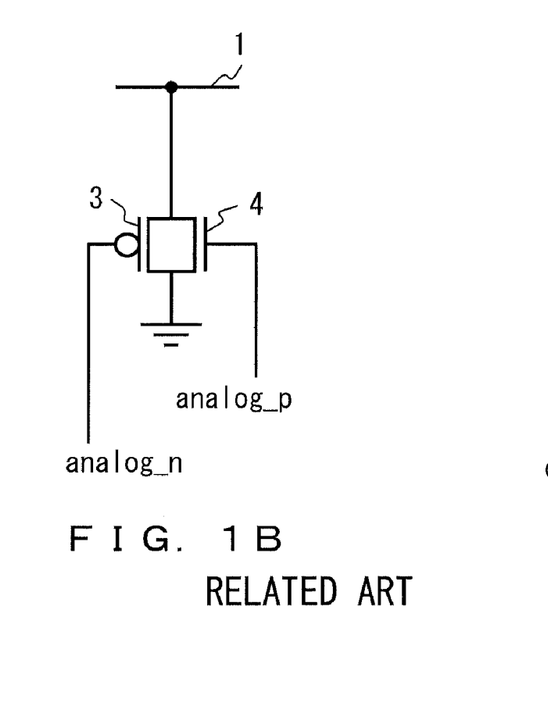
Figure 1C:
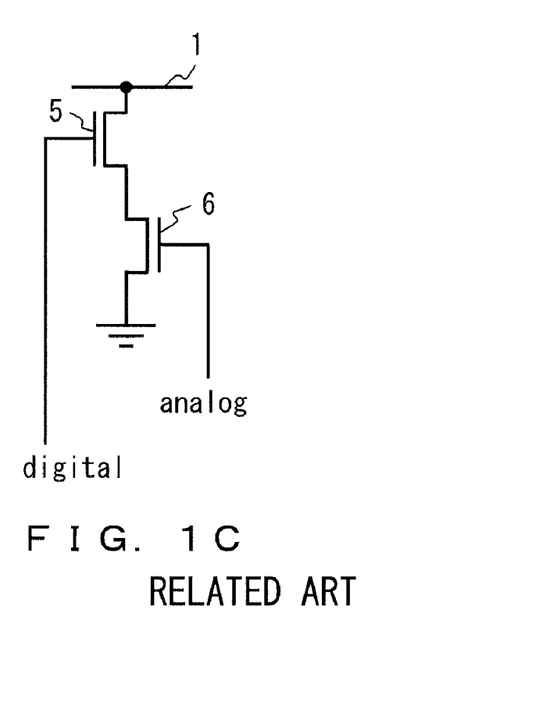

FIG. 1A through FIG. 1C respectively illustrate termination circuits according to first through third conventional examples. In these diagrams, the circuit configurations of only the pull-down side are illustrated. This is because these circuits have basically the same configurations regardless of whether they are disposed on the pull-down side or the pull-up side. By referring to these diagrams, conventional termination circuits will be explained.

In FIG. 1A through FIG. 1C, "digital" represents a digital signal, and "analog" represents an analog signal. "1" represents a node on a transmission line or a signal line connected to that node. Herein, "1" is referred to as a connection node.

The termination circuit illustrated in FIG. 1A has a plurality of N-channel MOS FETs (referred to as "NMOS transistors, hereinafter) 2-0 through 2-$n$ (in the diagram, there are $n+1$ NMOS transistors). The NMOS transistors 2-0 through 2-$n$ are connected in parallel each other and they are connected to the connection node 1. Resistance values (gate widths) of the NMOS transistors 2-0 through 2-$n$ are different from each other. Resistance value of the termination circuit (referred to as "termination resistance value", hereinafter) is controlled by selecting one or more of the NMOS transistors 2 using the digital signals [0]-[n]. In FIG. 1A, "[0]" through "[n]" added to "digital" represent correspondence to the NMOS transistors 2-0 through 2-$n$.

Other examples of termination circuits that adjust the termination resistance value by selecting MOS transistors with digital signals are described in, for example, Japanese Laid-open Patent Publication No. 2006-332276 and Japanese Laid-open Patent Publication No. 2006-42136.

The resistance value between drain and source of an NMOS transistor varies depending upon the voltage applied to the gate (gate-source voltage). The termination circuit illustrated in FIG. 1B is described, for example, in Japanese Laid-open Patent Publication No. 7-297678. In that termination circuit, a P-channel MOS FET (referred to as "PMOS transistor" hereinafter) 3 and an NMOS transistor 4 are connected in parallel and they are connected to the connection node 1. The termination resistance value is controlled by adjusting the voltages of analog signals "analog" supplied respectively to the gates of the MOS transistors 3 and 4. Note that "analog_n" and "analog_p" represent analog signals to be supplied to the NMOS transistor 3 and PMOS transistor 4, respectively.

In another termination circuit, a PMOS transistor and an NMOS transistor are connected in parallel, and digital signals are supplied to the gate of each MOS transistor instead of analog signals.

The termination circuit illustrated in FIG. 1C is described in, for example, Japanese Laid-open Patent Publication No. 9-261035. That termination circuit has a configuration in which the drain of an NMOS transistor 5 is connected to the connection node 1 and an NMOS transistor 6 is provided between the source of the NMOS transistor 5 and the ground. That is, two NMOS transistors 5 and 6 are cascoded.

In the termination circuit illustrated in FIG. 1C, a digital signal "digital" and an analog signal "analog" are supplied to the NMOS transistor 5 and the NMOS transistor 6, respectively. The termination resistance value is adjusted by the analog signals "analog".

In a termination circuit, the resistance value between the drain and the source of a MOS transistor varies depending upon a voltage applied to the drain or the source. Thus, the termination resistance value of the termination circuit varies depending upon a voltage applied to the termination circuit. In the termination circuits described above, the voltage applied to the drains of the NMOS transistors 2 in FIG. 1A, the voltage applied to the source and the drain of the PMOS transistor 3 and the NMOS transistor 4 in FIG. 1B, and the voltage applied to the drains of the NMOS transistors 5 and 6 vary due to the voltage at the connection node 1. The variation of the termination resistance value causes impedance mismatching of a transmission line. Thus, the variation of the termination resistance value is desired to be suppressed.

In the termination circuit illustrated in FIG. 1A, i.e., a circuit in which only digital signals are supplied to the gate, it is difficult to suppress variations in the termination resistance value caused by variation in the voltage at the connection node 1. In the termination circuit as illustrated in FIG. 1B or FIG. 10, i.e., a circuit in which analog signals are supplied to the gate, variations in the termination resistance value may be suppressed by adjusting analog signals supplied to the gate. However, this configuration requires a circuit for generating analog signals, making the circuit scale larger. This is undesirable in view of production cost.

In the pull-up side, the voltage between drain and source of a MOS transistor varies similarly depending upon the voltage at the connection node 1. The voltage between drain and source of the MOS transistor also varies depending upon variations in power source voltage (bias voltage). Accordingly, it is important to prevent matching conditions from being deteriorated by variations in the terminal resistance value (total resistance value) regardless of configurations of terminal circuits.

SUMMARY

According to an aspect of the invention, a termination circuit connected to a transmission line includes a resistance circuit. The resistance circuit is disposed on at least one of a pull-up side, which is between the transmission line and a power source, and a pull-down side, which is between the transmission line and ground, and includes a diode connected MOS transistor.

According to another aspect of the invention, a termination circuit connected to a transmission line includes first and second resistance circuits. The first resistance circuit is disposed on at least one of a pull-up side, which is between the transmission line and a power source, and a pull-down side, which is between the transmission line and ground, and has a negative property, by which an increase in an applied voltage decreases a resistance value of the first resistance circuit. The second resistance circuit is connected in parallel to the first resistance circuit and has a positive property, by which an increase in the applied voltage increases a resistance value of the second resistance circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A through FIG. 2E illustrate first through fifth element resistance circuits, respectively;

DESCRIPTION OF EMBODIMENTS

Hereinafter, embodiments of the invention will be explained in detail by referring to the drawings. FIG. 2A through FIG. 2E respectively illustrate element resistance circuits that use a MOS transistor. FIG. 3 through FIG. 7 depict the properties of the element resistance circuits. First, explanations will be given for the configuration and the property of each element resistance circuit by referring to FIG. 2A through FIG. 7.

FIG. 2A through FIG. 2E illustrate individual element resistance circuits designed to be disposed on pull-down side. However, similar configurations are employed when those element resistance circuits are disposed on pull-up side. Accordingly, unless otherwise noted, explanations herein below will be given for descriptive purposes on the assumption that the element resistance circuits are disposed on pull-down side The first element resistance circuit illustrated in FIG. 2A includes NMOS transistor 21. A specified (or fixed) voltage corresponding to a digital signal is applied to the gate of the NMOS transistor 21. Hereinafter, application of a specified voltage to a gate such as that above is referred to as "gate-grounded".

Figure 2A:
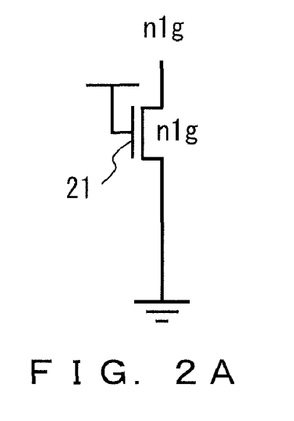

The expression "n1g" in FIG. 2A represents a circuit configuration in which the NMOS transistor 21 is gate-grounded. The expression "n" specifies the type of the MOS transistor, and it specifies an NMOS transistor in FIG. 2A. The expression "1" is a symbol expressing the number of MOS transistors included in an element resistance circuit, and the expression "g" is a symbol expressing gate-grounded. This rule applies to other figures.

Figure 2B:
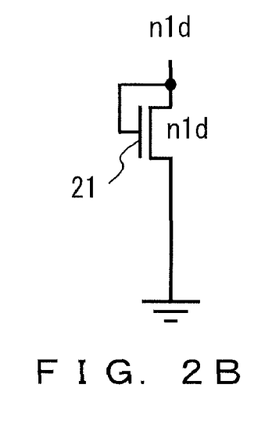

The second element resistance circuit illustrated in FIG. 2B has a configuration in which the NMOS transistor 21 with diode-connected, i.e., the gate and the drain of the NMOS transistor 21 are connected. The expression "d" of "n1d" in FIG. 2B is a symbol expressing diode-connected.

Figure 2C:
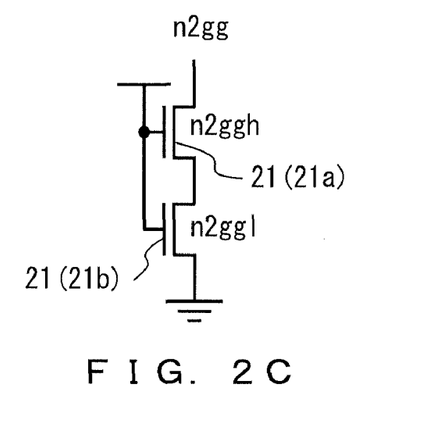

The third element resistance circuit illustrated in FIG. 2C has a configuration in which two gate-grounded NMOS transistors 21 are in cascade connection. The number "2" included in the expression "n2gg" in FIG. 2C expresses the number of MOS transistors in cascade (the number of stages). The expression "gg" expresses the types of connections of those MOS transistors 21 included in the element resistance circuit. The first "g" expresses the connection type of a MOS transistor 21a disposed on the upper side of the figure, i.e., the side away from the ground. The second "g" expresses the connection type of a MOS transistor 21b disposed on the lower side of the figure i.e., the side proximate to the ground. The connection types of those MOS transistors are both gate-grounded.

The expressions "n2ggh" and "n2ggl" in FIG. 2C express the type of element resistance circuit including NMOS transistors 21 (21a, 21b) and the position at which the individual NMOS transistors 21 are disposed in an element resistance circuit. For example, "n2ggh" represents the NMOS transistor 21 disposed on the transmission line side in the third element resistance circuit. Thus, "h" indicates that the MOS transistor is disposed on the transmission line side, and "l" indicates that the MOS transistor is disposed on the ground side. This rule applies to the fourth element resistance circuit, which will be explained later. Hereinafter, the transmission line side and the ground side are referred to as an upper side and a lower side, respectively.

Figure 2D:
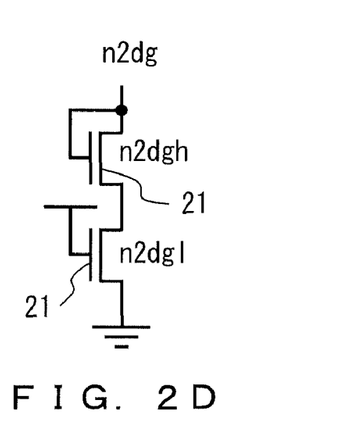

The fourth element resistance circuit illustrated in FIG. 2D has a configuration in which two NMOS transistors 21 are in cascode connection, similarly to those in the third element resistance circuit. However, the upper side NMOS transistor 21 is diode-connected. Also, the lower side NMOS transistor 21 is gate-grounded. Thus, the circuit configuration of the element resistance circuit in FIG. 2D is denoted by "n2dg".

Figure 2E:
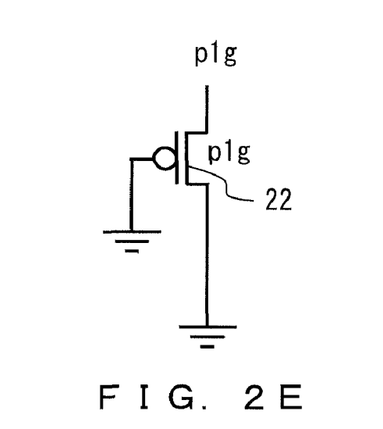

The fifth element resistance circuit illustrated in FIG. 2E has PMOS transistor 22 whose gate is grounded. The expression "p1g" in FIG. 2E indicates that the fifth element resistance circuit has a circuit configuration in which one PMOS transistor 22 is gate-grounded.

Figure 3:
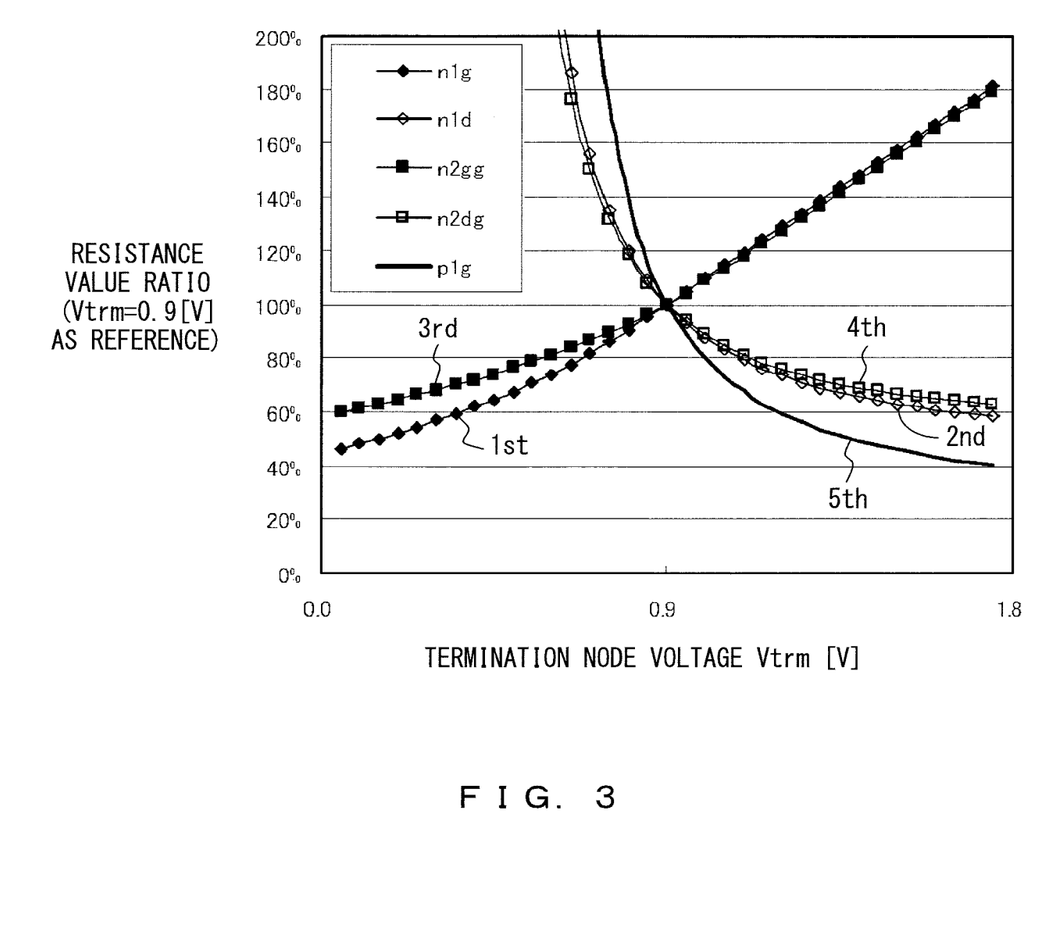
FIG. 3 is a graph depicting the resistance value of element resistance circuit with respect to the termination node voltage.

FIG. 3 is a graph depicting the resistance values of the element resistance circuits illustrated in FIG. 2A through FIG. 2E with respect to the termination node voltage. In FIG.

3, the horizontal axis represents termination node voltage Vtrm, and the vertical axis represents resistance value ratios. The termination node voltage corresponds to a voltage applied to an element resistance circuit. The resistance value ratio is depicted with a reference (=100 percent) when the voltage applied to an element resistance circuit is 0.9V.

As illustrated in FIG. 3, the first element resistance circuit (n1g) and the third element resistance circuit (n2gg) have a positive property, by which an increase in an applied voltage increases the resistance value. The second, the fourth, and the fifth element resistance circuits (n1d, n2dg, p1g) have a negative property, by which an increase in an applied voltage decreases the resistance value.

In the region where a termination node voltage is 0.9V or lower, the resistance value of the third element resistance circuit varies less than that of the first element resistance circuit. Therefore, the third element resistance circuit has a better property with respect to variation in the termination node voltage (applied voltage) than the first element resistance circuit.

The approximation formula expressing a current flowing between the drain and the source of a MOS transistor in a non-saturated region is as below, where Ids represents a current between the drain and the source:

$$Ids = \beta((Vgs - Vt)Vds - (Vds)^2/2) \quad (1)$$

where β represents a current gain coefficient, Vgs represents a voltage between the gate and the source, Vds represents a voltage between the drain and the source, and Vt represents a threshold voltage for forming a channel.

From formula (1), resistance value R of an element resistance circuit is expressed by:

$$\begin{aligned} R &= Vds/Ids \quad (2) \\ &= Vds/(\beta((Vgs-Vt)Vds - (Vds)^2/2)) \\ &= 1/(\beta((Vgs-Vt) - Vds/2)) \end{aligned}$$

When "(h)" is a symbol indicating that Vds is 0.9V, i.e., a reference voltage, and "(l)" is a symbol indicating that Vds is a lower voltage than 0.9V, the resistance value ratio is:

$$R(l)/R(h) = ((Vgs-Vt)-Vds(h)/2)/((Vgs-Vt)-Vds(l)/2) \quad (3)$$

(Vgs−Vt) in formulas (1) through (3) are constant. Also, reference voltage Vds (h) is constant as a reference value for resistance value ratios. Accordingly, formula (3) is expressed as below by using constants C1 and C2.

$$R(l)/R(h) = C1/(C2 - Vds(l)) \quad (4)$$

From formula (4), it is understood that the less voltage Vds (1) varies, the less resistance value ratios vary.

Figure 4:
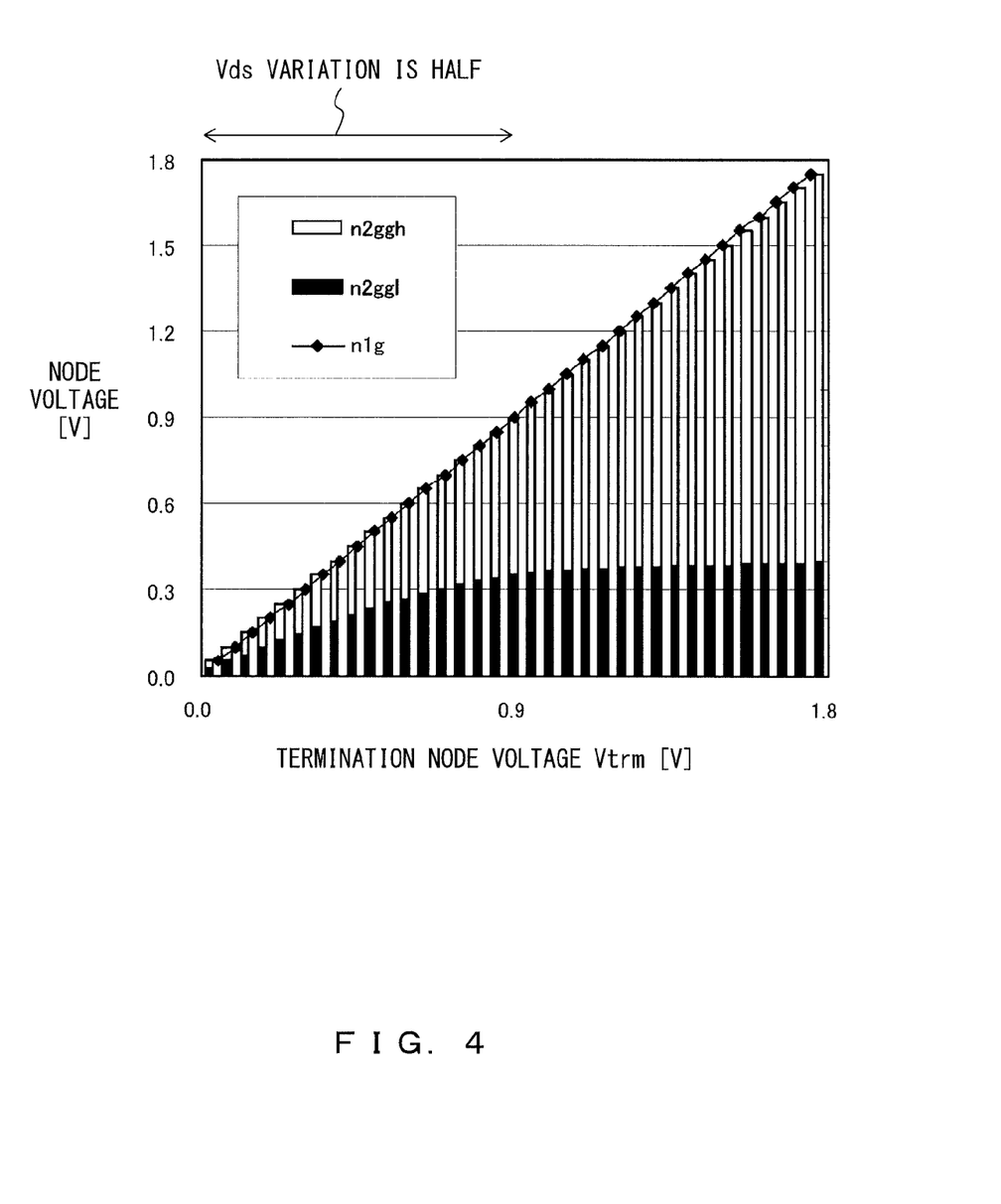
FIG. 4 is a graph depicting variations in drain-source voltages of respective MOS transistors in the first and third element resistance circuits with respect to the termination node voltage.

FIG. 4 is a graph depicting variations in the drain-source voltages of the respective MOS transistors in the first and third element resistance circuits with respect to the termination node voltage. In FIG. 4, the horizontal axis represents termination node voltages and the vertical axis represents drain-source voltages Vds as node voltages. Regarding the third element resistance circuit, node voltage Vds is depicted in the form of bars for each of the NMOS transistors 21 (21a, 21b) included in the third element resistance circuit.

In the region where the termination node voltage is low, the drain-source voltages (node voltages in FIG. 4) Vds of the upper and lower NMOS transistors 21 (21a, 21b) are roughly equal to each other in the third element resistance circuit. That is, each drain-source voltage of the NMOS transistors 21 (21a, 21b) is approximately a half of the termination node voltage. Accordingly, the variation in the resistance value ratio of the third element resistance circuit due to the termination node voltage is roughly equal to the variation in the resistance value ratio in each NMOS transistor 21 (21a, 21b). The third element resistance circuit has a configuration in which two NMOS transistors 21 are connected in series, and accordingly the resistance value ratio (resistance variation ratio) of the third element resistance circuit as a resistor made by combining the two NMOS transistors 21 is equal to the resistance value ratio of each NMOS transistor 21.

The fact that the drain-source voltages Vds are roughly equal to each other between the respective NMOS transistors 21 in the third element resistance circuit means that variation in each drain-source voltage Vds is smaller than the variation in the termination node voltage. This is because the variation in each drain-source voltage Vds is roughly half the variation in the termination node voltage. The fact that effective variation in each drain-source voltage Vds is smaller is thought to be the reason that variation in the resistance value ratio is smaller than that of the first element resistance circuit, as illustrated in FIG. 3. For this reason, it is expected that similar effect would be brought about in an element resistance circuit including three or more NMOS transistors in cascode. In a comparison between the first and third element resistance circuits, the total node voltage of the first element resistance circuit tends to be lower in the region where the termination node voltage is low, and the total node voltage of the first element resistance circuit tends to be higher in the region where the termination node voltage is high. In the region where the termination node voltage is high, the higher the termination node voltage is, the greater the voltage difference between the first and third element resistance circuits.

Figure 5:
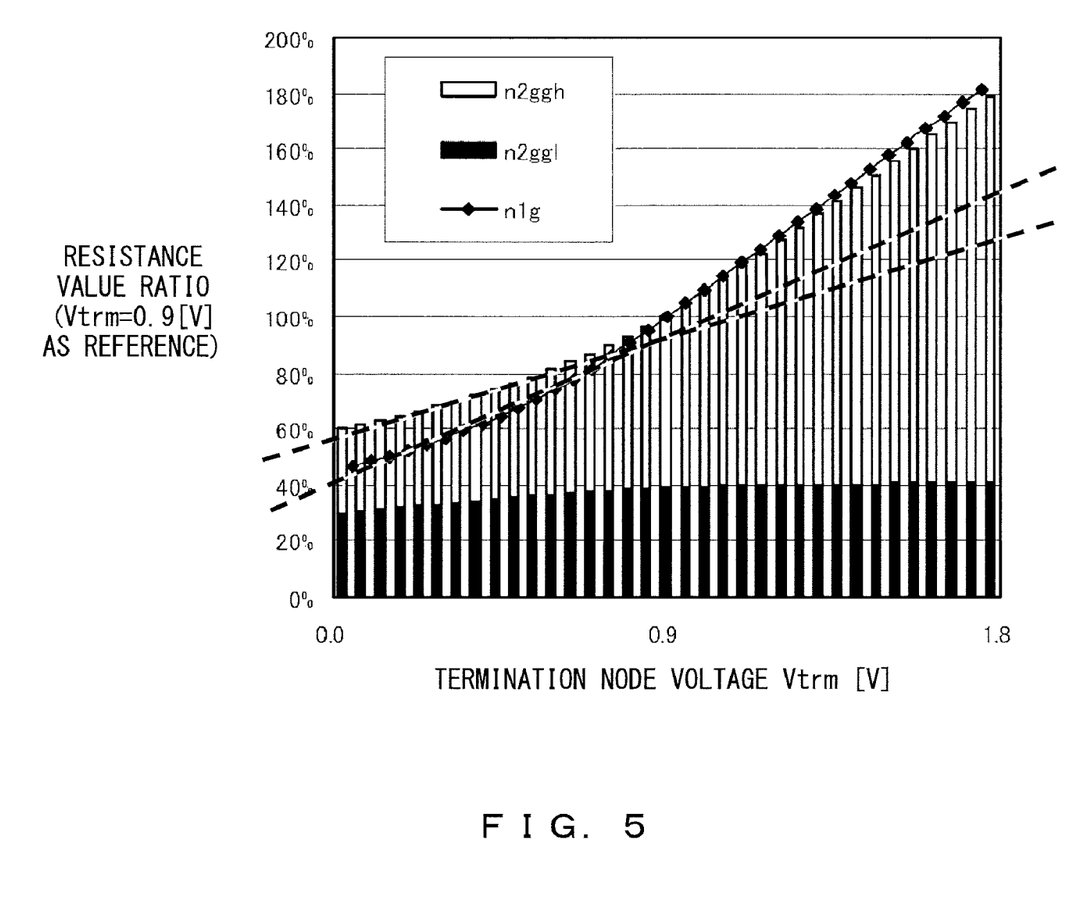
FIG. 5 is a graph depicting variations in resistance values of respective MOS transistors in the first and third element resistance circuits with respect to the termination node voltage.

FIG. 5 is a graph depicting variations in the resistance values of the respective MOS transistors in the first and third element resistance circuits with respect to the termination node voltage. The variation is expressed by resistance value ratio. The horizontal axis represents termination node voltages, and the vertical axis represents resistance value ratios. The resistance value ratio is depicted with a reference (=100 percent) when the termination node voltage as an applied voltage is 0.9V. The resistance values are calculated from the node voltage of each MOS transistor corresponding to each termination node voltage illustrated in FIG. 4 and the current of the MOS transistor for the termination node voltage. Similarly to FIG. 4, the resistance value ratio of each of the NMOS transistors 21 in the third element resistance circuit is depicted in the form of bars. In FIG. 5, straight lines representing the variations in the resistance value ratios of the first and third element resistance circuits are depicted. By viewing those two straight lines, the difference in slope of the resistance value ratios between the first and third element resistance circuits is confirmed.

In the region where the termination node voltage is low, as illustrated in FIG. 5, the upper and lower NMOS transistors 21 in the third element resistance circuit are roughly equal to each other in resistance value ratio. However, the resistance value ratio of the lower NMOS transistor 21n2ggl varies little where the termination node voltage is higher. In the range where the termination node voltage is high, the entire resistance value ratio of the third element resistance circuit increases, with a slope similar to the resistance value ratio of the first element resistance circuit. From this fact too, it may be considered that effective variations that are smaller in the drain-source voltage Vds of each of the two NMOS transistors 21 in the third element resistance circuit make the third element resistance circuit have a smaller variation in the resistance value ratio in the region where the termination node voltage is low than the first element resistance circuit.

Figure 6:
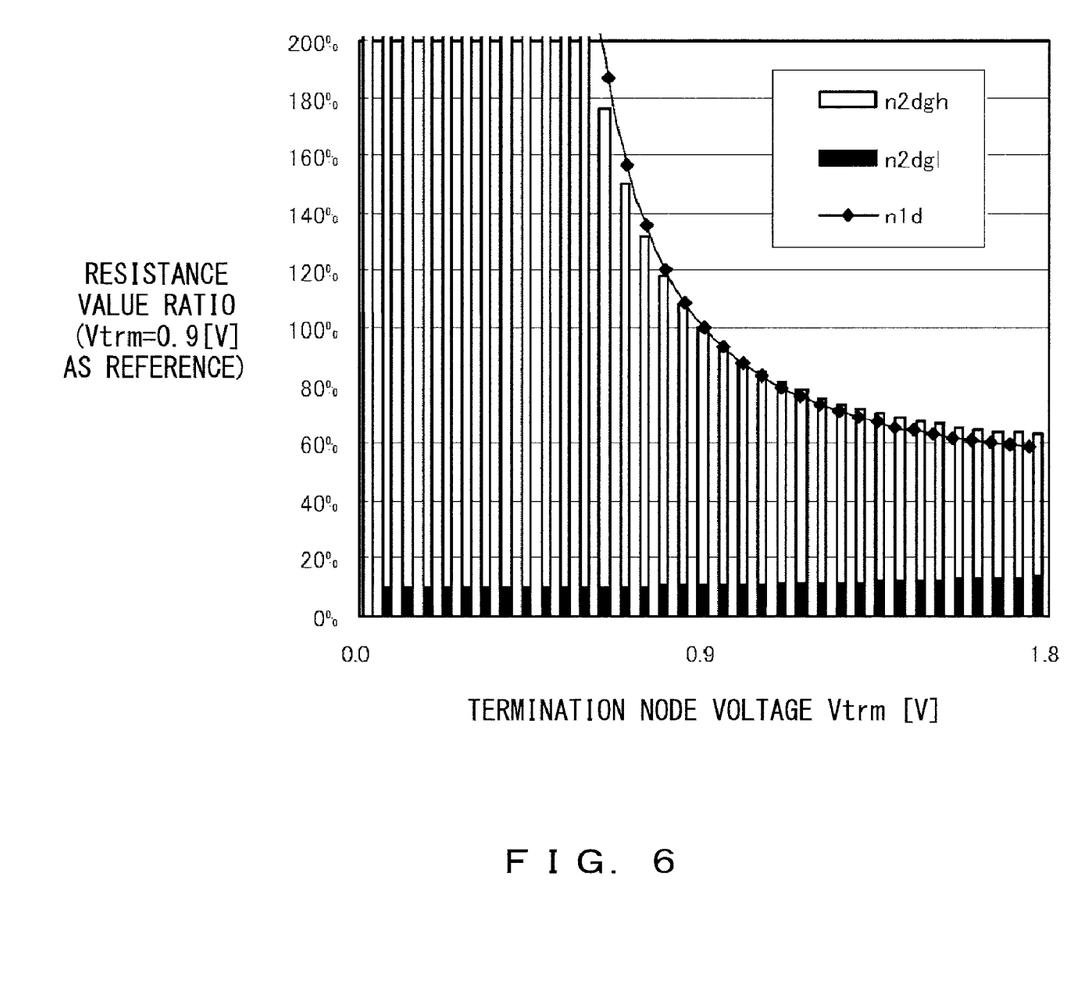
FIG. 6 is a graph depicting variations in resistance values of respective MOS transistors in the second and fourth element resistance circuits with respect to the termination node voltage.

FIG. 6 is a graph depicting variations in resistance values of the respective MOS transistors in the second and fourth element resistance circuits with respect to the termination node voltage. The variation is expressed by resistance value ratio. The horizontal axis represents termination node voltages, and the vertical axis represents resistance value ratios. The resistance value ratio is depicted with a reference (=100 percent) when the voltage applied to an element resistance circuit is 0.9V. Similarly to the case in FIG. 5, the resistance value ratio of each of the NMOS transistors 21 in the fourth element resistance circuit is depicted in the form of bars.

As illustrated in FIG. 6, the ratio at which the resistance of the lower side NMOS transistor 21n2dgl in the fourth element resistance circuit occupies the resistance of the entire fourth element resistance circuit is kept very low. Thus, improvement due to cascade of NMOS transistors is small. The reason for this is considered to be that the upper side NMOS transistor 21n2dgh always operates in a saturated state (high resistance) in the strong inversion region, which forces the lower side NMOS transistor 21n2dgl to be in a non-saturated state (low resistance). Thus, it is thought that three or more NMOS transistors may be in cascode, but great improvement is not be expected even when a greater number of stages are employed. The resistance value ratio of the second element resistance circuit is higher than the fourth element resistance circuit in the region where the terminal node voltage is low, and is lower in the region where the terminal node voltage is high.

As illustrated in FIG. 3, the second, fourth and fifth element resistance circuits have a negative property, by which an increase in an applied voltage (termination node voltage) decreases the resistance value, and the first and third element resistance circuits have a positive property, which is opposite to the negative property. That is, variations in the resistance values with respect to an applied voltage are somewhat symmetric between the "first and third" element resistance circuits and the "second, fourth, and fifth" element resistance circuits. However, the symmetry with the positive property of the first and third element resistance circuits is different in the second, fourth, and fifth element resistance circuits. Specifically, the symmetry with the first and third element resistance circuits is poorer in the fifth element resistance circuit than the second and fourth element resistance circuits. If the symmetry of the second and fourth element resistance circuits with respect to the first and third element resistance circuits is considered, the fourth element resistance circuit has better property. On the other hand, if the symmetry of the first and third element resistance circuits with respect to the second and fourth element resistance circuits is considered, the third element resistance circuit has better property. Thus, it is understood that diode connected and cascode connection (casdoding) of MOS transistors brings about the effect of improving symmetry of the element resistance circuits. Also, configuring a pull-down resistance circuit using only NMOS transistor(s) has merits in view of layout.

Figure 7:
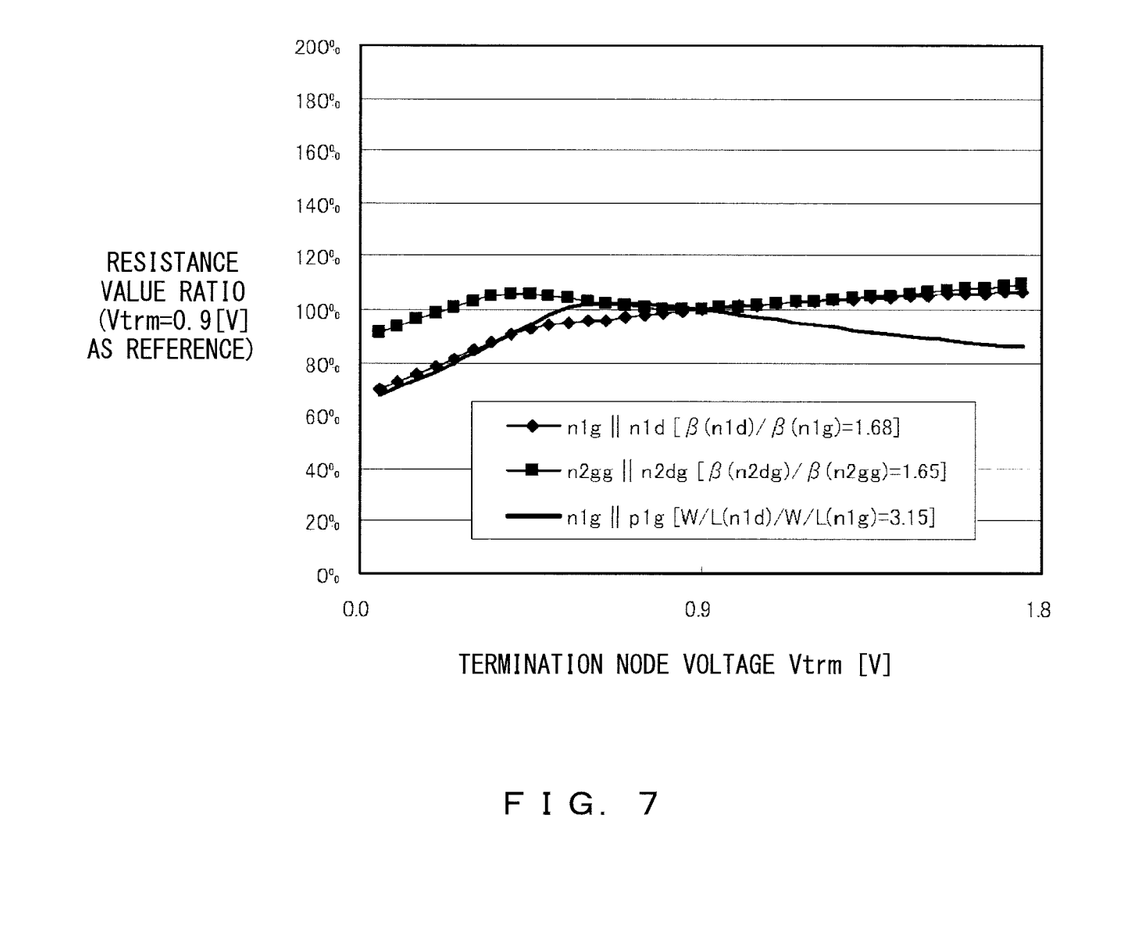
FIG. 7 is a graph depicting variations in resistance values with respect to the termination node voltage for a combination of element resistance circuits.

FIG. 7 is a graph depicting variations in resistance value with respect to the termination node voltage for a combination of the element resistance circuits connected in parallel. In FIG. 7, the horizontal axis represents terminal node voltages, and the vertical axis represents resistance value ratios. The resistance value ratio is depicted with a reference (=100 percent) when the voltage applied to an element resistance circuit is 0.9V. In this example, three combinations are compared. The first combination is realized by the first and second element resistance circuits connected in parallel, and represented by "n1g∥n1d". The second combination is realized by the third and fourth element resistance circuits connected in parallel, and represented by "n2gg∥n2dg". The third combination is realized by the first and fifth element resistance circuits connected in parallel, and represented by "n1g∥p1g". The third combination may correspond to the configuration described in Japanese Laid-open Patent Publication No. 2006-42136.

For each combination, gate width W is optimized on the condition that the resistance value in the entire element resistance circuit varies the least when the termination node voltage is varied in the range between 0.05[V] and 1.75[V]. Accordingly, in FIG. 7, the variation in the resistance values of combinations of optimized element resistance circuits are depicted.

The expressions "$\beta(n1d)/\beta(n1g)=1.68$" and "$\beta(n2dg)/\beta(n2gg)=1.65$" represent, in the form of ratios of current gain coefficient $\beta$, the results of optimization based on the first and second combinations, respectively. The expressions "n1d" and "n1g" in parentheses represent the types of the combined element resistance circuits, respectively. For example, the expression "$\beta(n1d)/\beta(n1g)=1.68$" indicates that the quotient of current gain coefficient $\beta$ of the NMOS transistor 21 of the second element resistance circuit divided by current gain coefficient $\beta$ of the NMOS transistor 21 of the first element resistance circuit after the optimization in the first combination is 1.68.

The expression "W/L (p1g)/W/L(n1g)=3.15" in FIG. 7 represents the resultant value obtained by dividing gate width W by gate length L, which is the length in the direction in which the current flows, and this value represents the result of the optimization in the third combination. Specifically, this value represents the ratio between the value of W/L of the fifth element resistance circuit and the value of W/L of the first element resistance circuit. Accordingly, FIG. 7 illustrates that, as the result of the optimization, the value of the ratio is 3.15.

As illustrated in FIG. 7, the first and second combinations yield variations in the resistor values (resistance value ratio) that are smaller than those of the third combination both on the high-voltage side and the low-voltage side. Also, variations in the resistance values of the first and second combinations are more moderate than that of the third combination. On the low-voltage side, the second combination yields variations in the resistance value smaller than that of the first combination. Thus, the second combination has the property that the resistance value varies the least among the three combinations. The fact that the first and second combinations are better than the third combination on the high-voltage side is due to an effect of diode connection (diode connected transistor). The fact that the second combination is better than the other combinations is due to an effect of cascode connection.

The termination circuit according to the embodiments has a configuration in which element resistance circuits are combined so as to reduce variation in the resistance value caused by variations in the termination node voltage, taking the properties of the above element resistance circuits into consideration. Thereby, it is possible to prevent matching conditions on a transmission line from being deteriorated. Hereinafter, detailed explanations will be given for termination circuits.

Figure 8:
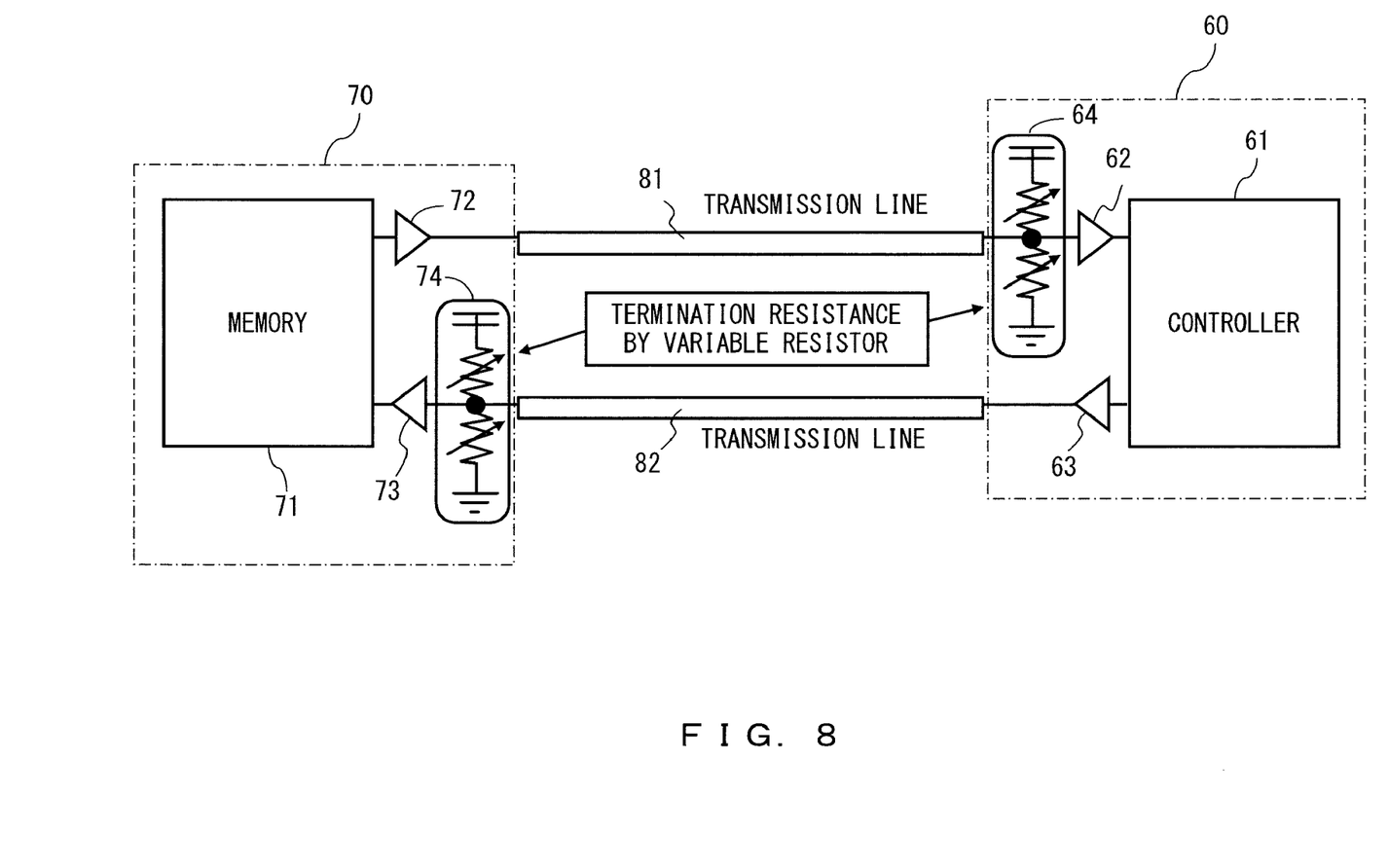
FIG. 8 illustrates an application example of a termination circuit according to the embodiment.

FIG. 8 illustrates an example of application of the termination circuit according to the embodiment. In the example illustrated in FIG. 8, termination circuits 64 and 74 according to the embodiment are used respectively in semiconductor devices of a controller 60 and a memory device 70 that are connected to each other by two transmission lines 81 and 82. The controller 60 is used for accessing the memory device 70.

The transmission line 81 is a transmission line dedicated to signals output from the memory device 70, and the transmission line 82 is a transmission line dedicated to signals input to the memory device 70. Accordingly, the termination circuit 64 is provided on the side of the controller 60 of the transmission line 81. The termination circuit 74 is provided on the side of the memory 70 of the transmission line 82.

In addition to the termination circuit 64, the controller 60 is provided with a main control unit 61, a receiver circuit 62 for receiving signals transmitted through the transmission line 81, and a driver circuit 63 for outputting signals to the transmission line 82. These elements are implemented, for example, on a single chip. In addition to the termination circuit 74, the memory device 70 is provided with a memory element 71, a driver circuit 72 for outputting signals to the transmission line 81, and a receiver circuit 73 for receiving signals transmitted through the transmission line 82. Also, these elements are implemented, for example, on a single chip. A semiconductor device to which the termination circuit according to the embodiment is applied, i.e., a semiconductor device according to the embodiment, may be of a type other than the controller 60 or the memory device 70. An electronic device according to the embodiment may be implemented by using the semiconductor device including the termination circuit according to the embodiment.

Figure 9A:
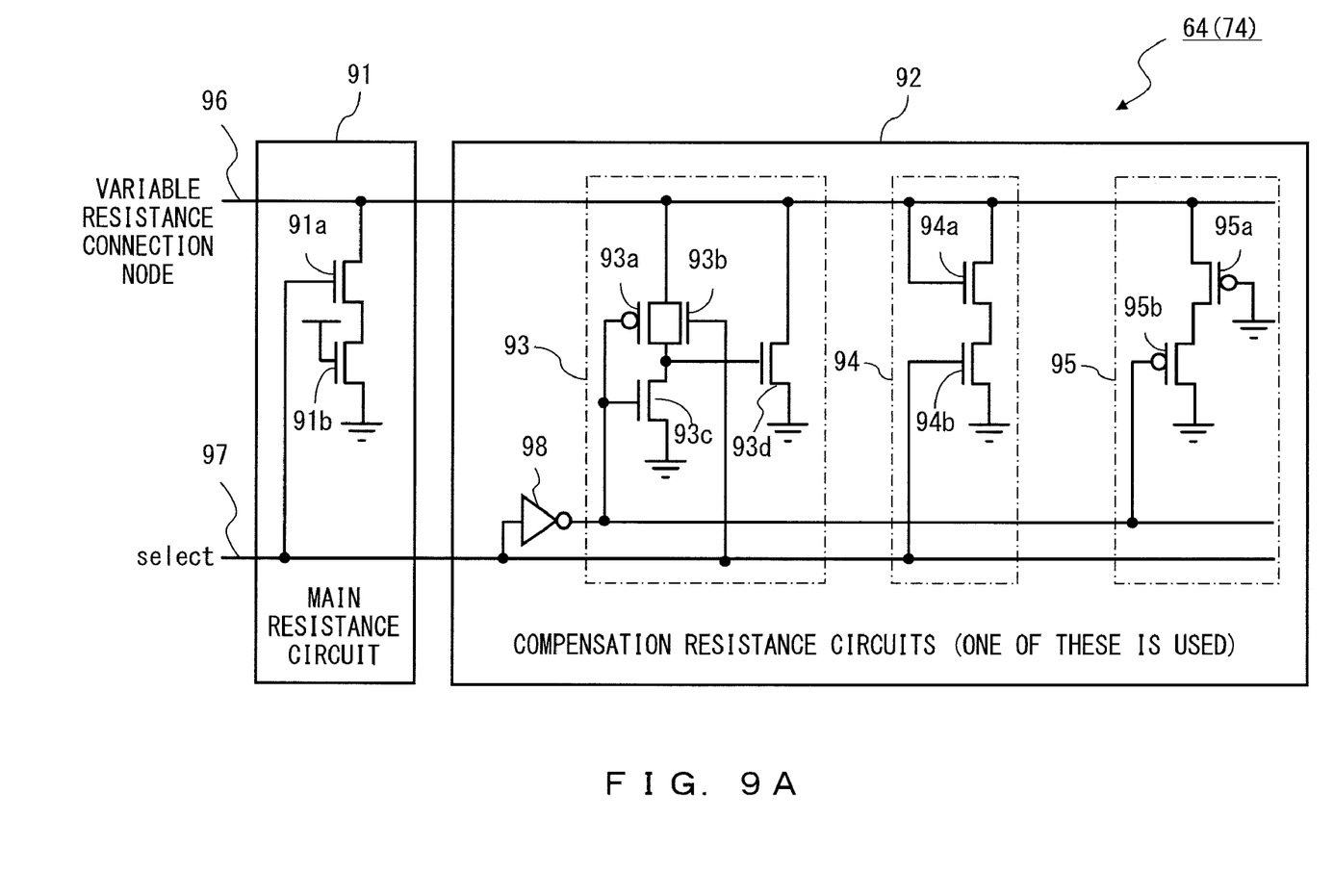
FIG. 9A illustrates a configuration of a termination circuit according to the embodiment.

FIG. 9A illustrates a configuration of the terminal circuit according to the embodiment. The termination circuits 64 and 74 are basically equal to each other in configuration, and accordingly, for descriptive purposes, explanations will be given by paying attention to the termination circuit 64 implemented (mounted) on the termination circuit 64.

The termination circuit 64 employs Thevenin termination configuration, in which resistor circuits are disposed in both the pull-up side and the pull-down side of the transmission line 81 in FIG. 8. However, a resistor circuit does not have to employ a different configuration with respect to the side on which that resistor circuit is disposed, and accordingly only the pull-down side resistance circuit is illustrated in FIG. 9A. Circuit that may be employed for the termination circuit 64 are not limited to Thevenin termination configuration, and other configuration may be employed.

The resistance circuit on the pull-down side of the termination circuit 64 has a main resistance circuit 91 and a compensation resistance circuit 92. The main resistance circuit 91 and the compensation resistance circuit 92 are connected in parallel. The main resistance circuit 91 has a positive property, by which an increase in a voltage (applied voltage) at a node (referred to as a "connection node" hereinafter) 96 on the transmission line 81 to which the termination circuit 64 is connected increases the resistance value. The compensation resistance circuit 92 has a negative property, by which an increase in the applied voltage decreases the resistance value.

Variable resistors are connected to the connection node 96, for example, on the pull-down side and the pull-up side, respectively. FIG. 9A illustrates only characteristic portions of the termination circuits 64 (and 74).

In the first through fifth element resistance circuits illustrated in FIG. 2A through FIG. 2E, the first and third element resistance circuits have a positive property. In the third element resistance circuit, the resistance value varies less than that of the first element resistance circuit. Accordingly, as the main resistance circuit 91 of the termination circuit 64, the third element resistance circuit is employed.

The main resistance circuit 91 has cascoded NMOS transistors 91a and 91b. In the NMOS transistor 91a, the drain, the source, and the gate are connected to the connection node 96, the drain of the NMOS transistor 91b, and the select signal line 97, respectively. In the NMOS transistor 91b, the source is grounded, and the gate continuously receives the power voltage. The termination circuit 64 enters the active state when the signal on the select signal line 97 becomes the H level.

In the first through fifth element resistance circuits illustrated in FIG. 2A through FIG. 2E, the second, fourth, and fifth element resistance circuits have a negative property. As described above, among the second, fourth, and fifth element resistance circuits, the fifth element resistance circuit is poorer than the other element resistance circuits in symmetry with the positive property of the third element resistance circuit. Accordingly, as the compensation resistance circuit 92 of the termination circuit 64, the second or fourth element resistance circuit is employed.

Figure 9B:
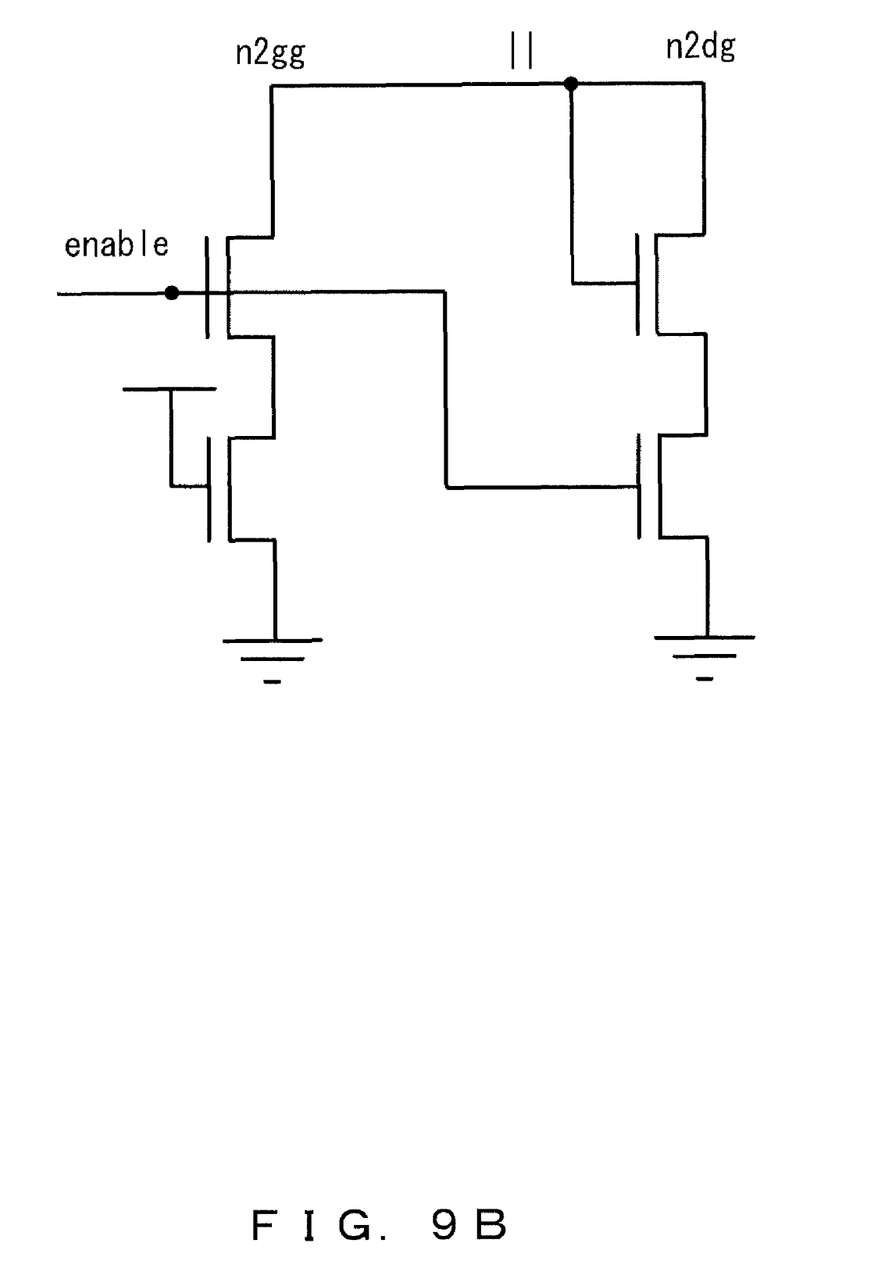
FIG. 9B illustrates an example of the termination circuit illustrated in FIG. 9A.

In FIG. 9A, three element resistance circuits 93 through 95 are illustrated as the compensation resistance circuit 92. The element resistance circuits 93 through 95 are candidates for circuits to be used as the compensation resistance circuit 92, and one of them actually serves as the compensation resistance circuit 92. Thus, the termination circuit according to the embodiment has one of the element resistance circuits 93 through 95 selected as the compensation resistance circuit 92 and the main resistance circuit 91. The selected one of the element resistance circuits 93 through 95 and the main resistance circuit 91 are connected in parallel. FIG. 9B illustrates the termination circuit in which the element resistance circuit 94 is employed as the compensation resistance circuit 92.

The element resistance circuit 93 corresponds to the second element resistance circuit, and the element resistance circuits 94 and 95 correspond to the fourth element resistance circuit. The element resistance circuits 93 through 95 have configurations as described below.

The element resistance circuit 93 includes one PMOS transistor 93a, and three NMOS transistors 93b through 93d. The source of the PMOS transistor 93a and the drain of the NMOS transistor 93b are connected to the connection node 96. The drain of the PMOS transistor 93a and the source of the NMOS transistor 93b are connected to the drain of the NMOS transistor 93c. The source of the NMOS transistor 93c is grounded. The drain, source, and gate of the NMOS transistor 93d are connected to the connection node 96, the ground, and the drain of the NMOS transistor 93c, respectively.

The gates of the PMOS transistor 93a and the NMOS transistor 93c are connected to the select signal line 97 via an inverter 98. The gate of the NMOS transistor 93b is connected to the select signal line 97. Thereby, when the element resistance circuit 93 is in active state, almost all current that has flowed from the connection node 96 and through the PMOS transistor 93a and the NMOS transistor 93b is supplied to the gate of the NMOS transistor 93d, and thus the NMOS transistor 93d is diode connected.

To the gate of the NMOS transistor 93d, the transistors 93a and 93b, which are of a different type transistor from each other, are connected in parallel. This configuration is employed so that the combined resistance value of the PMOS transistors 93a and 93b is reduced and the variation range of the combined resistance value caused by variations in voltage applied to the element resistance circuit 93, i.e., the voltage of the connection node 96, may also be narrowed. Thereby, diode connection in a more desirable form is realized.

The element resistance circuit 94 has two cascoded NMOS transistors 94a and 94b. In the NMOS transistor 94a, diode connection is implemented by connecting the drain and the gate to the connection node 96. The drain, the source, and the gate of the NMOS transistor 94b are connected to the source of the NMOS transistor 94a, the ground, and the select signal line 97, respectively.

The element resistance circuit 95 has two cascoded PMOS transistors 95a and 95b. In the PMOS transistor 95a, the source and the gate are connected to the connection node 96 and the ground, respectively, so as to implement diode connection. The drain, the source, and the gate of the PMOS transistor 95b are connected to the ground, the drain of the PMOS transistor 95a, and the select signal line 97 via the inverter 98, respectively.

The element resistance circuits 93 through 95 having the above configuration suppress variation more in the resistance values on the high-voltage side due to the effect of diode connection. On the low-voltage side, variation in resistance values is suppressed due to the effect of cascode connection of the transistors in the main resistance circuit 91. Accordingly, the variations in the resistance value both on the low-voltage side and the high-voltage side are suppressed compared to the conventional termination circuit described in Japanese Laid-open Patent Publication No. 2006-42136. Thereby, the matching condition is kept in good state across a broad voltage range.

In addition, when it is necessary to suppress variations in resistance values only in the high-voltage side, the first element resistance circuit as illustrated in FIG. 2A may be employed as the main resistance circuit 91. When, by contrast, it is necessary to suppress variations in resistance values only in the low-voltage side, the fifth element resistance circuit as illustrated in FIG. 2E may be employed as the compensation resistance circuit 92. These configurations may also make the variation range of resistance values narrower than that of the conventional termination circuit described in Japanese Laid-open Patent Publication No. 2006-42136, and matching conditions is kept in better state.

Figure 10:
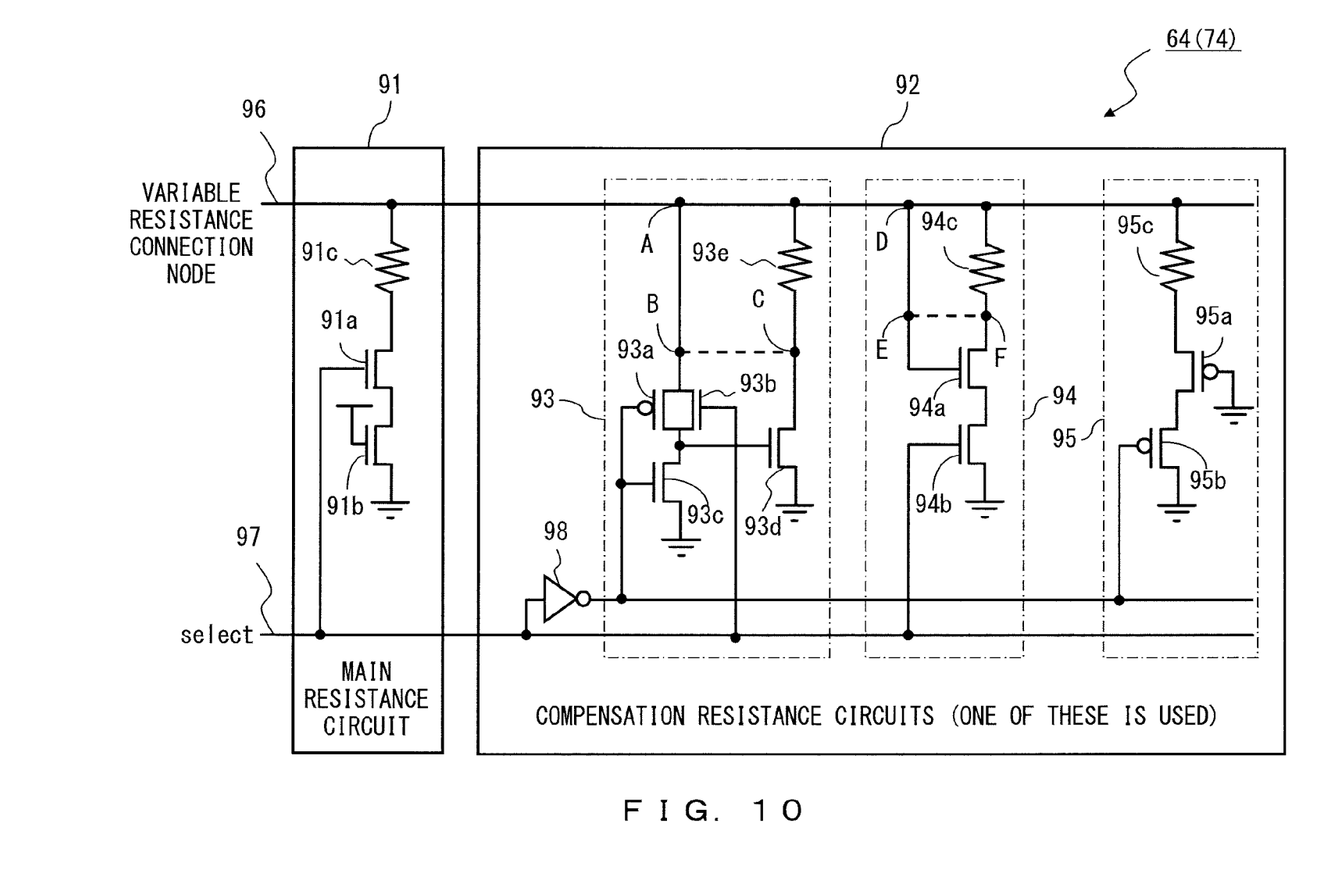
FIG. 10 and FIG. 11 illustrate variation examples of a termination circuit.

The main resistance circuit 91, and the element resistance circuit 93 through 95 may be configured by using a resistor (resistor element) as illustrated in FIG. 10. Specifically, the resistor 91c may be disposed between the NMOS transistor 91a and the connection node 96 in the main resistance circuit 91 as illustrated in FIG. 10. Similarly, in the element resistance circuits 93 through 95, it is possible to provide the resistors 93e, 94c, and 95c between the MOS transistors 93d, 94a, and 95a and the connection node 96, respectively.

In the configuration in which the resistors 93e, 94c, and 95c are inserted, the element resistance circuits 93 and 94 may be modified as described below.

In the element resistance circuit 93, it is possible to disconnect the connection between nodes A and B and to connect nodes B and C as illustrated by the dashed line. In other words, it is possible to connect the respective MOS transistors 93a and 93b to the connection node 96 by using the resistor 93e. Similarly, in the element resistance circuit 94, it is possible to disconnect the connection between nodes ID and E and to connect nodes E and F as illustrated by the dashed line so that current is supplied to the gate of the NMOS transistor 94a from the connection node 96 and via the resistor 94c.

Figure 11:
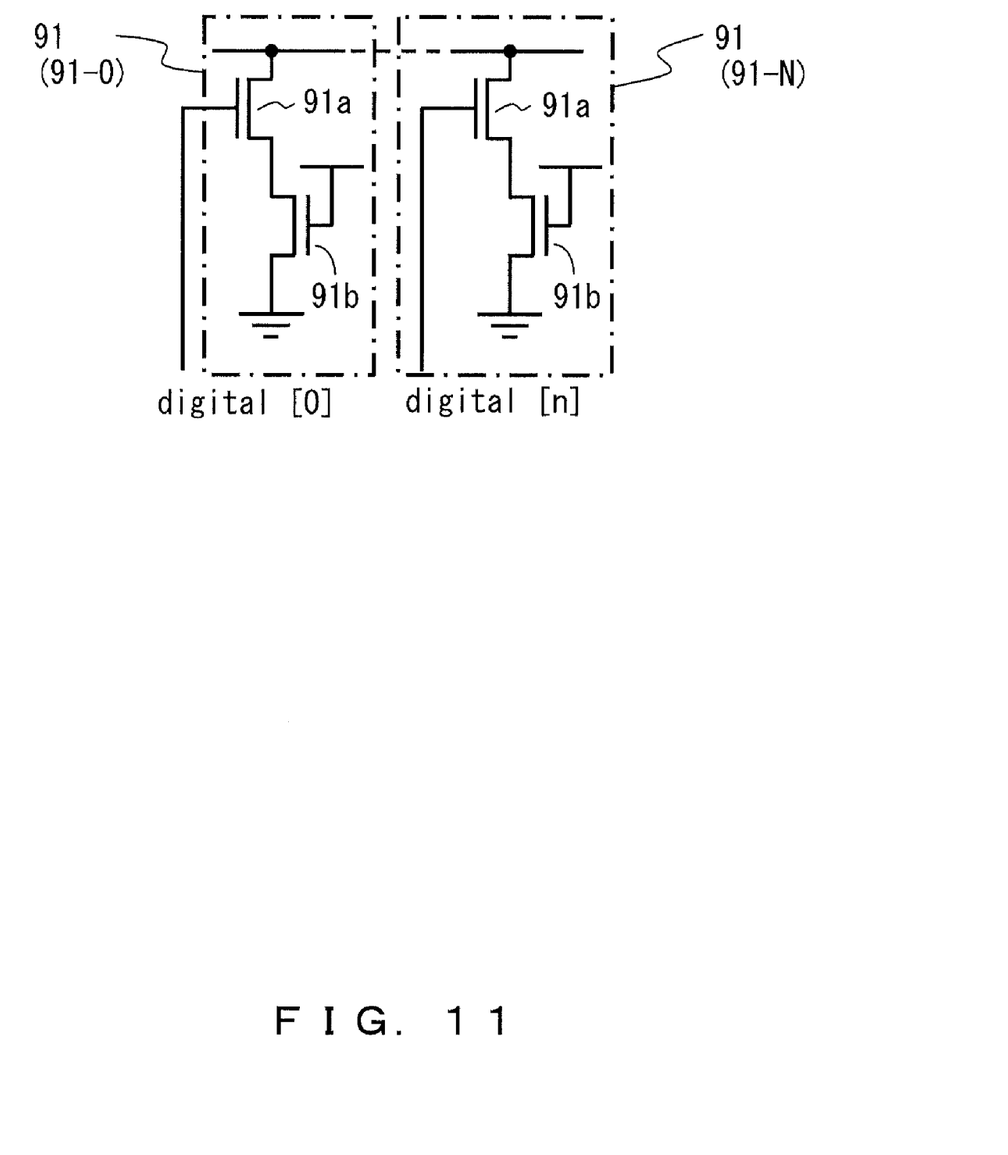

A plurality of main resistance circuits 91 may be connected in series and a plurality of compensation resistance circuits 92 may be connected in series. As illustrated in FIG. 11, it is possible to prepare plural main resistance circuits 91 including NMOS transistors 91a and 91b whose resistance values between the drain and the source (on-resistance value) are the same or different to each other. In this configuration, one or more of the main resistance circuit 91 is selected by controlling current (digital signal "digital") supplied to the gate according to desired resistance value. This applies to the compensation resistance circuit 92. FIG. 11 illustrates an exemplary configuration for a case in which n+1 main resistance circuits 91-0 through 91-n are prepared as the main resistance circuits 91, and one or more of them is selected to be activated by digital signals (select signals) [0] through [n].

As described above, the termination circuit according to the embodiment includes first and second resistance circuits. The first resistance circuit has negative property and the second resistance circuit has positive property. The property indicates, for example, resistance value with respect to applied voltage. It is preferable that the negative property of the first resistance circuit is symmetry with the positive property of the second resistance circuit. In this case, the variation or error in resistance value of the first and second resistance circuit is cancelled by each other. Thus, the variation or error in resistance value of the termination circuit caused by variation in voltage applied to the termination circuit may be small. Accordingly, matching condition is kept in an excellent state.

The second resistance circuit has two or more cascoded MOS transistors. The cascoded circuit suppresses variations in voltages applied to the respective MOS transistors. Thus, the variation in total resistance value of the resistance circuit is kept small. Accordingly, the matching condition is kept in an excellent state. Note that the variation in resistance value may be suppressed significantly on the low-voltage side.

For example, the drain voltage of the respective MOS transistors in the two-stage MOS transistor circuit is smaller than the drain voltage of a MOS transistor in single-stage MOS transistor circuit. Accordingly, if the second resistance circuit is realized by cascoded two MOS transistors, the variation in the resistance value with respect to the variation in the drain voltage may be smaller than a case where the second resistance circuit is realized by single-stage MOS transistor.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has(have) been described in detail, it should be understood that the various changes, substitutions, and alterations could be made hereto without departing from the spirit and scope of the invention.

What is claimed is:

1. A termination circuit connected to a transmission line, comprising:
   a resistance circuit being disposed on at least one of a pull-up side, which is between the transmission line and a power source, and a pull-down side, which is between the transmission line and ground, and having a diode connected MOS transistor, wherein
   the resistance circuit includes
      a first resistance circuit with a negative property, by which an increase in an applied voltage decreases a resistance value of the first resistance circuit; and
      a second resistance circuit with a positive property, by which an increase in the applied voltage increases a resistance value of the second resistance circuit,
   the first and second resistance circuits are connected in parallel.

2. The termination circuit according to claim 1, wherein the second resistance circuit has at least two cascoded MOS transistors.

3. The termination circuit according to claim 1, wherein the resistance circuit has another MOS transistor cascoded to the diode connected MOS transistor.

4. A termination circuit connected to a transmission line, comprising:
 a first resistance circuit being disposed on at least one of a pull-up side, which is between the transmission line and a power source, and a pull-down side, which is between the transmission line and ground, and having a negative property, by which an increase in an applied voltage decreases a resistance value of the first resistance circuit; and
 a second resistance circuit being connected in parallel to the first resistance circuit, and having a positive property, by which an increase in the applied voltage increases a resistance value of the second resistance circuit.

5. The termination circuit according to claim 4, wherein the second resistance circuit has two cascoded MOS transistors.

6. The termination circuit according to claim 4, wherein the first resistance circuit has a diode connected MOS transistor.

7. A semiconductor device connected to a transmission line for inputting signal into the semiconductor device, comprising:
 a termination circuit connected to a transmission line, the termination circuit includes a resistance circuit being disposed on at least one of a pull-up side, which is between the transmission line and a power source, and a pull-down side, which is between the transmission line and ground, and having a diode connected MOS transistor, wherein
 the resistance circuit includes
  a first resistance circuit with a negative property, by which an increase in an applied voltage decreases a resistance value of the first resistance circuit; and
  a second resistance circuit with a positive property, by which an increase in the applied voltage increases a resistance value of the second resistance circuit,
 the first and second resistance circuits are connected in parallel.

* * * * *